United States Patent [19]

Horovitz et al.

[11] Patent Number: 5,812,795
[45] Date of Patent: Sep. 22, 1998

[54] AUTOMATIC ADDRESSING OF MESSAGES AND MESSAGE COMPONENTS OF DIFFERENT MEDIA

[75] Inventors: David Abraham Horovitz, Highland Park, N.J.; Omar A. Salem, Westminster; Marshal F. Willis, Castle Rock, both of Colo.

[73] Assignee: Lucent Technologies Inc., Murray Hill, N.J.

[21] Appl. No.: 588,970

[22] Filed: Jan. 19, 1996

[51] Int. Cl.⁶ .................................................. G06F 13/38
[52] U.S. Cl. ................................ 395/200.75; 395/200.36
[58] Field of Search ..................... 395/200.16, 200.15, 395/200.04, 200.75, 200.68, 200.36; 370/432; 379/93, 96, 93.24, 100.08; 340/325.53

[56] References Cited

U.S. PATENT DOCUMENTS

| | | | |
|---|---|---|---|
| 4,734,931 | 3/1988 | Bourg et al. | 379/93 |
| 5,239,577 | 8/1993 | Bates et al. | 379/201 |
| 5,276,869 | 1/1994 | Forrest et al. | 395/600 |
| 5,315,705 | 5/1994 | Iwami et al. | 395/200 |
| 5,396,536 | 3/1995 | Yudkowsky | 379/52 |
| 5,459,717 | 10/1995 | Mullan et al. | 370/54 |
| 5,487,100 | 1/1996 | Kane | 379/57 |
| 5,513,126 | 4/1996 | Harkins et al. | 395/200.36 |
| 5,594,872 | 1/1997 | Kawano et al. | 395/600 |
| 5,630,060 | 5/1997 | Tang et al. | 395/200.36 |
| 5,634,010 | 5/1997 | Ciscon et al. | 395/200.15 |

FOREIGN PATENT DOCUMENTS

3196242  8/1991  Japan.

OTHER PUBLICATIONS

H. Newton, *If My PC, and 105 Million Others, Were a Phone,* Computer Telephony, vol. 3, Issue 8, Aug. 1995, 4 pages.

The AT&T Intuity™ System Message Manager, AT&T, PM–7756, 4 pages., 1994.

The AT&T Intuity™ Audix® Voice Messaging System, AT&T, PM–7733R., 1994.

Intuity™ Voice Processing Solutions, AT&T, PM–7732., 1994.

*Primary Examiner*—Mark H. Rinehart
*Attorney, Agent, or Firm*—David Volejnicek

[57] ABSTRACT

A message sender (104) is equipped with a facility (250, 251) that automatically addresses the sender's messages and/or message components expressed in different media to the appropriate different addresses of the intended message recipient, in response to receiving an identification, such as the name, of the intended message recipient from the message sender. The message sender has an electronic directory (250) that lists, for at least some message recipients, a plurality of different telephone numbers and indicates for each telephone number the message medium or media that can be received at that address. The message sender further has a message manager (251) graphical user interface to a multi-media messaging system (101) that automatically responds to the sender-provided identity of the intended message recipient by finding in the directory either the message recipient's one telephone number for receiving all of the media in which the message is expressed, or the message recipient's telephone numbers for receiving each of the media if the one telephone number does not exist, and then addressing the message or the components of the message with the corresponding telephone number or numbers prior to sending the message to the intended recipient.

15 Claims, 5 Drawing Sheets

FIG. 1
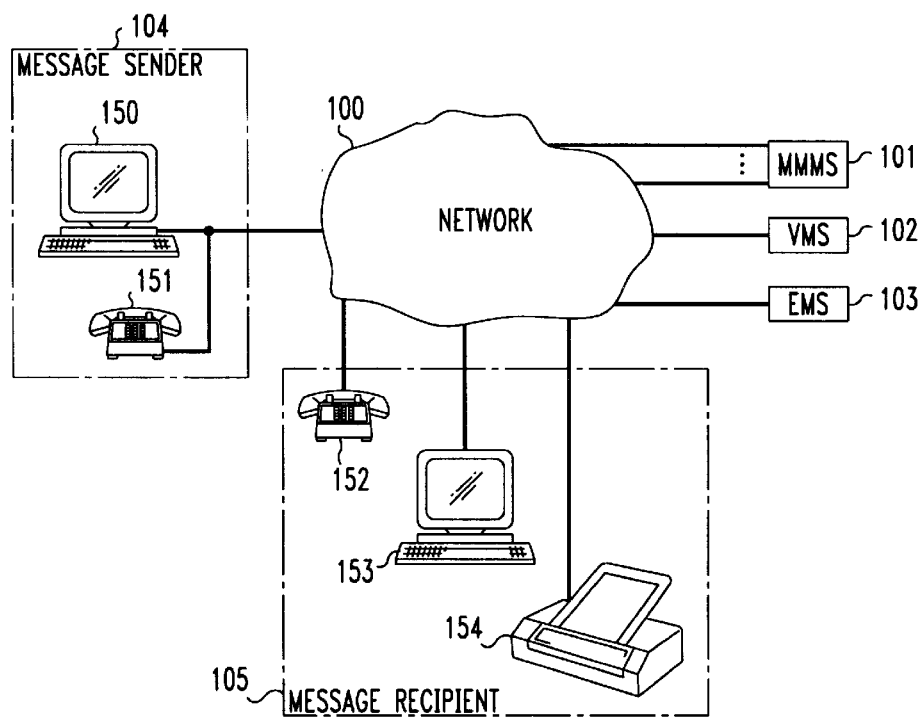
FIG. 2
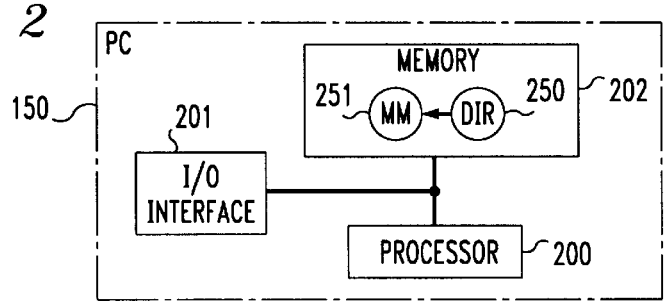
FIG. 3

AUTOMATIC ADDRESSING OF MESSAGES AND MESSAGE COMPONENTS OF DIFFERENT MEDIA

TECHNICAL FIELD

This invention relates to electronic messaging systems.

BACKGROUND OF THE INVENTION

Electronic messaging systems are well known in the art. Included among them are voice messaging systems and e-mail systems, and—more recently—multi-media messaging systems. Multi-media messaging systems handle messages having message components expressed in one or a plurality of different media, such as audio (voice), e-mail, fax, text, and video.

While a multi-media messaging system may be able to handle messages expressed in any medium or media, not all subscribers of the system may be equipped with multi-media workstations capable of receiving messages expressed in any medium or media, but rather may be equipped with different user terminals for receiving messages expressed in different media. For example, such subscribers may be equipped with a telephone for receiving audio messages or message components, a fax machine for receiving fax messages or message components, and either a data terminal or a personal computer for receiving e-mail and text messages or message components. Furthermore, some of the message recipients may be subscribers of a different messaging system or systems that do not handle all of the media. For example, some message recipients may be subscribers of a voice messaging system for receiving audio messages, and of an e-mail messaging system for receiving e-mail messages.

Typically, the different user terminals and the different messaging systems have different communication network addresses. For example, if a user's terminals and messaging systems are communicatively connected to the "outside world" by the telephone network, they typically have different telephone numbers. This forces a message sender to look up the unique address of an intended message recipient for each medium that the sender wishes to use in a message to the message recipient, and then to manually address each message or message component accordingly. This is a bothersome procedure for the message sender, and it is prone to error.

Attempts have been made to allow a message recipient's terminals to share a single address. These typically involve equipping the message recipient with special equipment that interfaces the recipient's multiple terminals to a single telephone line, which equipment determines the nature (e.g. medium) of an incoming communication (e.g., message) and sends it to the appropriate one of the recipient's terminals. This special equipment is quite complex, and hence is quite expensive—often prohibitively so. Consequently, this special equipment has not come into wide use.

SUMMARY OF THE INVENTION

This invention is directed to solving these and other problems and disadvantages of the prior art. Generally according to the invention, a message sender is equipped with a facility that automatically addresses the sender's messages and/or message components expressed in different media to the appropriate different addresses of an intended message recipient, in response to receiving an identification of the intended message recipient from the message sender. Illustratively, the message sender has, or has access to, an electronic directory that lists, for at least some recipients, a plurality of different addresses (e.g., telephone numbers) and indicates for each address the message medium or media that can be received at that address. The message sender further has a facility that automatically responds to the identity (e.g., the name) of an intended message recipient that is provided to it by the message sender, by retrieving the identified message recipient's address or addresses for the medium or media in which the sender's message is expressed, and addressing the sender's message, or the components of the sender's message, with the corresponding address or addresses of the identified message recipient, prior to sending the message to the message recipient.

Advantageously, the invention effects automatically the proper addressing of the message or message components of different media. The message sender is thus spared the effort and the pitfalls of having to do so manually. Furthermore, the selection and use of the proper destination address is done at the message sender's end of the messaging process, thereby eliminating the need for the message recipient to be equipped with a mechanism for channeling each different message or message component to its different proper destination.

According to a first aspect of the invention, a messaging apparatus comprises a memory for storing a directory of a plurality of addresses each associated with both a message recipient and an indication of media that the message recipient receives at the address, wherein at least some of the addresses are associated with both a same said message recipient and different said media, means cooperative with the memory means and responsive to receipt, from a sender of a message comprising one or more components each expressed in any one of a plurality of different media, of an identification of an intended recipient of the message, for automatically finding in the directory, for each said component of the message, an address at which the intended message recipient receives the medium in which the component is expressed, means cooperative with the finding means for automatically addressing each said component of the message with corresponding said found address prior to sending of the message from the message sender to the intended recipient, and means cooperative with the addressing means, for sending each said addressed component of the message from the message sender to the address with which the segment is addressed.

According to a second aspect of the invention, a messaging apparatus comprises a memory for storing a directory of a plurality of addresses each associated with both a message recipient and an indication of media that the message recipient receives at the address, wherein at least some of the addresses are associated with both a same said message recipient and different said media, means for generating a message comprising one or more components each expressed in any one of a plurality of different media, means cooperative with the memory and responsive to receipt, from a sender of the message, of an identification of an intended recipient of the message, for automatically finding in the directory, for each said component of the message, an address at which the intended message recipient receives the medium in which the component is expressed, means cooperative with the finding means, for automatically addressing each said component of the message with corresponding said found address prior to sending of the message from the generating means to the intended recipient, and means cooperative with the generating means and the addressing means, for sending each said addressed component from the generating means to the address with which the component is addressed.

According to a third aspect of the invention, a message sender interface, to a messaging apparatus having means for generating a message comprising one or more components each expressed in any one of a plurality of different media and means for sending each addressed said component of the message from the generating means to the address with which the component is addressed, comprises a memory for storing a directory of a plurality of addresses each associated with both a message recipient and an indication of media that the associated message recipient receives at the address, wherein at least some of the addresses are associated with both a same said recipient and different said media, first means cooperative with the memory and responsive to receipt, from a sender of a message generated by the generating means, of an identification of an intended recipient of the message, for automatically finding in the directory, for each said component of the message, an address at which the intended message recipient receives the medium in which the component is expressed, and second means cooperative with the finding means, for automatically addressing each said component of the message with the corresponding said found address prior to the sending means sending the message from the generating means to the intended recipient. Preferably, the message-sender interface comprises a computer-usable program storage device having directory means, said first means, and said second means embodied therein, said directory means for implementing said directory and said directory means, said first means, and said second means being computer-readable program code means for causing the computer to perform the functions of the message-sender interface.

According to a fourth aspect of the invention, a message-sender interface, to a messaging apparatus having a memory that stores a directory of a plurality of addresses each associated with both a message recipient and an indication of media that the associated message recipient receives at the address, wherein at least some of the addresses are associated with both a same said recipient and different said media, means for generating a message comprising one or more components each expressed in any one of a plurality of different media, and means for sending each addressed said component of the message from the generating means to the address with which the component is addressed, comprises first means cooperative with the memory and responsive to receipt, from a sender of a message generated by the generating means of an identification of an intended recipient of the message, for automatically finding in the directory, for each said component of the message, an address at which the intended message recipient receives the medium in which the component is expressed, and second means cooperative with the finding means, for automatically addressing each said component of the message with the corresponding said found address prior to the sending means sending the message from the generating means to the intended recipient. Preferably, the message-sender interface comprises a computer-usable program storage device having said first means and said second means embodied therein, said first means and said second means being computer-readable program code means for causing the computer to perform the functions of the message-sender interface.

These and other advantages and features of the invention will become more apparent from the following description of an illustrative embodiment of the invention taken together with the drawing.

BRIEF DESCRIPTION OF THE DRAWING

FIG. 1 is a block diagram of a telecommunications system that implements illustrative embodiments of the invention;

FIG. 2 is a block diagram of a personal computer of a message sender of the system of FIG. 1;

FIG. 3 is a block diagram of a directory of the personal computer of FIG. 2;

DETAILED DESCRIPTION

Figure 4:
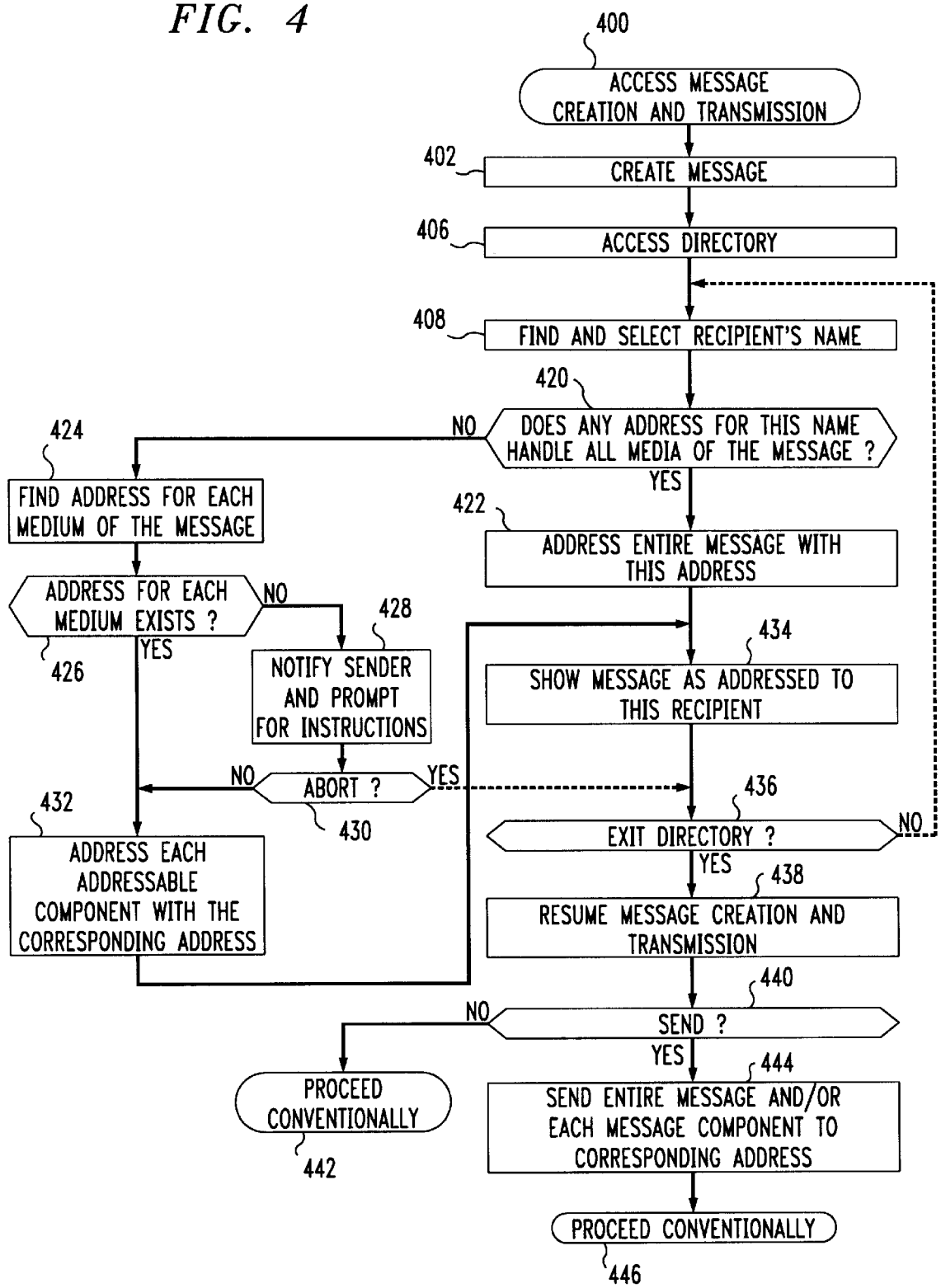
FIG. 4 is a flow diagram of operations of a message manager of the personal computer of FIG. 2 that implement a first illustrative embodiment of the invention.

FIG. 1 shows a telecommunications system comprising a plurality of messaging systems 101–103 interconnected by a network 100 with terminal equipment of a plurality of messaging service subscribers 104–105. Illustratively, network 100 is the public telephone network. Illustratively, messaging systems 101–103 include a multi-media messaging system (MMMS) 101, such as the AT&T Intuity® system, a voice-messaging system (VMS) 102, and an e-mail system (EMS) 103. Messaging service subscribers include at least one message sender 104 and at least one message recipient 105. In this illustrative example, the terminal equipment of message recipient 105 is assumed to include a telephone 152 for generating and receiving audio messages and audio portions of multi-media messages, a data terminal 153 for generating and receiving text and e-mail messages and text and e-mail portions of multi-media messages, and a fax terminal 154 for generating and receiving fax messages and fax portions of multi-media messages. Message recipient 105 is also assumed to be a subscriber of VMS 102 and EMS 103, and optionally also of MMMS 101. Further in this illustrative example, the terminal equipment of message sender 104 is assumed to include a personal computer (PC) 150 and a telephone 151 for generating and receiving fax, e-mail, text, audio, and multi-media messages. Message sender 104 is also assumed to be a subscriber of MMMS 101, which is capable of handling fax, e-mail, text, audio, and multimedia messages and message components.

FIG. 2 shows the internal structure of PC 150. It comprises a processor 200, an input and output (I/O) interface 201 by means of which processor 200 communicates with a user through the keyboard and display of PC 150, and with message recipient 105 and messaging systems 101–103 through network 100. PC 150 also comprises a memory 202 that serves as a scratchpad memory for messages being generated by, or presented to, a user of PC 150, and that stores control programs and data for execution and use by processor 200. Memory 202 may either be the internal memory of PC 150, or it may comprise the internal memory along with an external portable memory device, such as a floppy disk, attached to (e.g., inserted in) a memory drive of PC 150, or it may be a memory on another device connected to PC 150 through a network.

Control data stored in memory 202 include a directory 250, also referred to as a personal phonebook. Directory 250 comprises a directory program and associated directory data. Directory 250 is shown in FIG. 3. The directory program implements a directory data structure that includes a plurality of entries 300, each for storing directory data corresponding to a different potential message recipient. Each entry 300 is identified by a name field 302 which contains the name (or another identifier) of the message recipient. Each entry 300 further includes at least one sub-entry 301. Each sub-entry 301 has an address field 303 that contains a telephone number (or some other address) of the named message recipient, and a media field 304 that identifies the message media that the named recipient can receive at this telephone number. For example, entry 300 for message recipient 105 includes a sub-entry 301 with the telephone number of VMS 102 in field 303 and audio medium indicated in field 304, a sub-entry 301 with the telephone number or other network 100 address of EMS 103 in field 303 and e-mail and text media indicated in field 304, a sub-entry 301 with the telephone number of fax terminal 154 in field 303 and fax medium indicated in field 304, and—if message recipient 105 is also a subscriber of MMMS 101—a sub entry 301 with the telephone number of MMMS 101 in field 303 and all media indicated in field 304.

Figure 6:
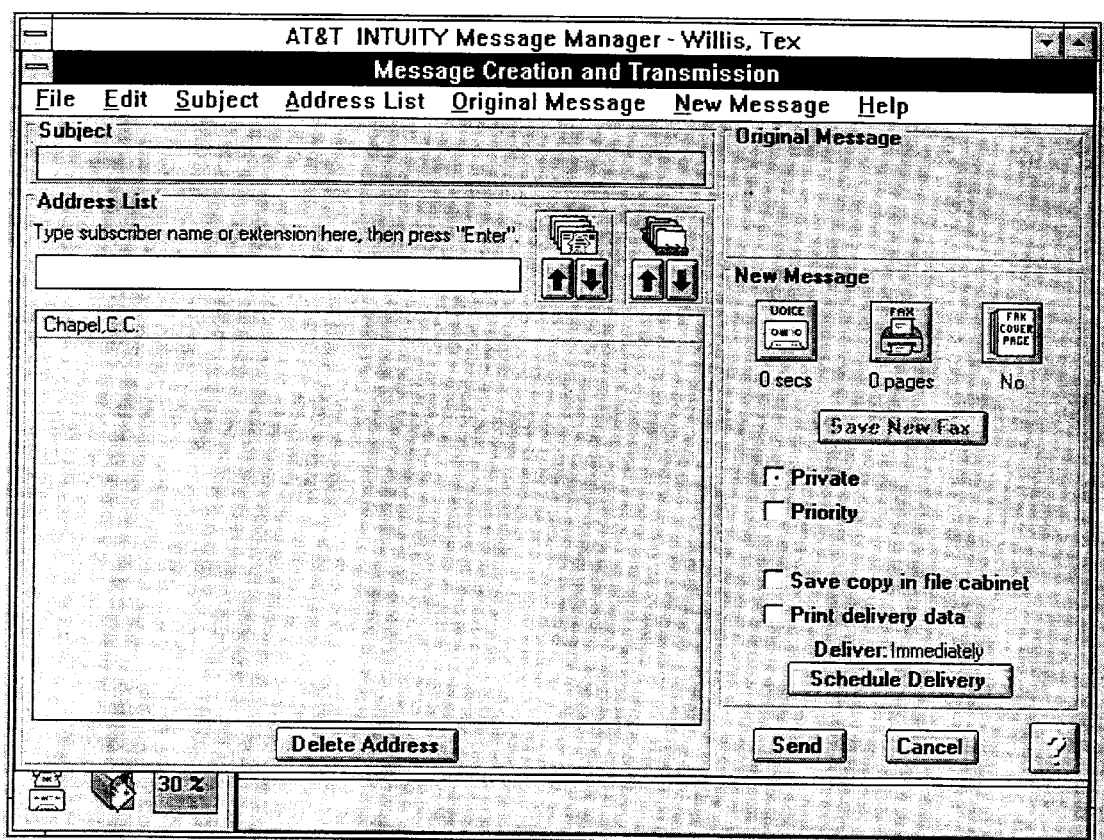
FIG. 6 shows an illustrative message creation and transmission display image implemented by the message manager of the personal computer of FIG. 2.
Figure 7:
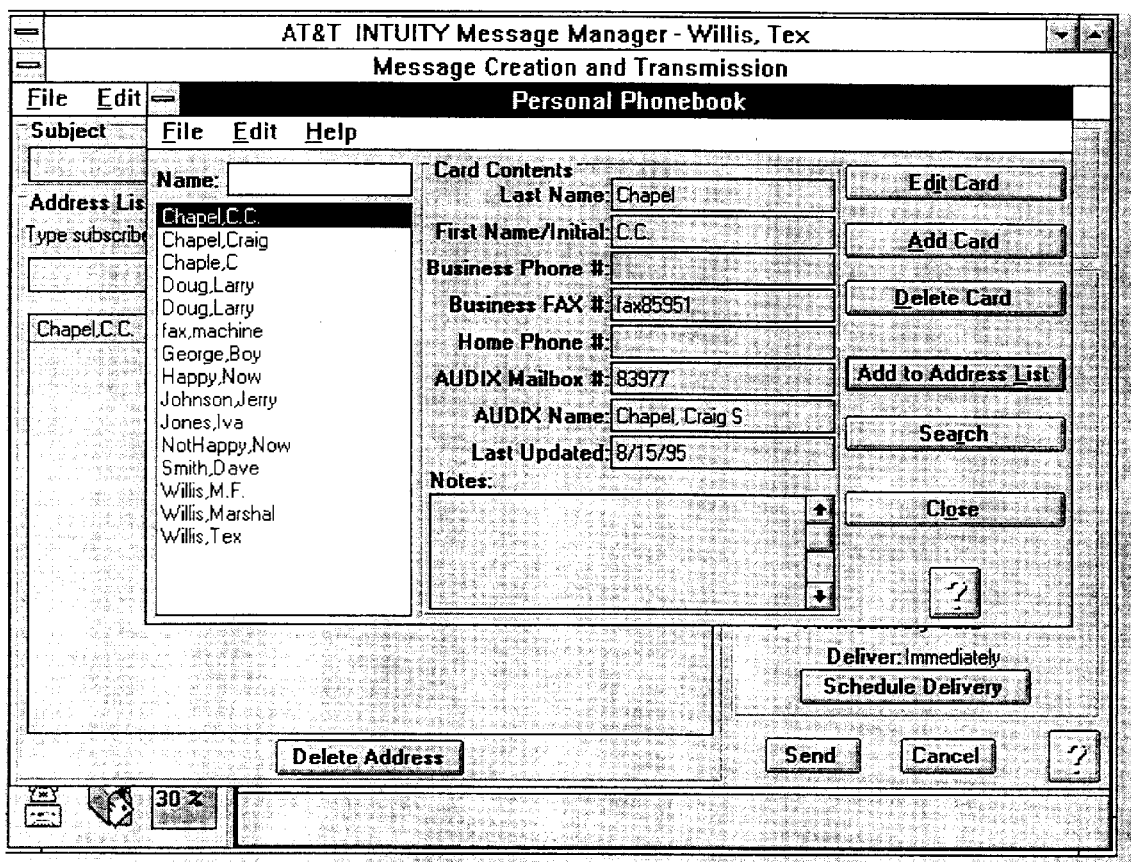
FIG. 7 shows an illustrative directory (personal phonebook) display image implemented by the message manager of the personal computer of FIG. 2.

Control programs stored in memory 202 in FIG. 2 and executed by processor 200 include a message manager (MM) 251 which implements a "windows"-type of graphical user interface to MMMS 101 for a user of PC 150. MM 251 is illustratively a version of the AT&T Intuity® Message Manager. MM 251 presents various interactive display images ("windows") via the display of PC 150 to a user of PC 150 for purposes of message creation, addressing, and retrieval. Included among them are message creation and transmission display images, an illustrative example of which is shown in FIG. 6, and personal phonebook display images, an illustrative example of which is shown in FIG. 7.

Alternatively, directory 250 and the message creation, addressing, and retrieval functionality of MM 251 may be implemented on MMMS 101 and accessed by a message sender via PC 150 through network 100.

As described so far, the system of FIG. 1 and its components are conventional. According to the invention, however, MM 251 is enhanced to provide an automatic message-addressing facility to a message-sending user of PC 150. Two different embodiments of this facility are respectively illustrated in FIGS. 4 and 5.

To create a message, the message sender invokes MM 251 on PC 150 and accesses the message creation and transmission window (see FIG. 6) thereof, at step 400, in a conventional manner. The message sender then creates the message in the conventional manner, at step 402, which may be either a single-medium message or a multi-media message expressed in any of the media supported by MMMS 101. The message sender then accesses the directory, or personal phonebook, window (see FIG. 7), at step 406. The message sender searches through directory entries 300 (see FIG. 3) to find and select a desired recipient of the message, at step 408. Upon the message sender selecting the desired recipient's directory entry 300, for example by pointing and clicking to the desired recipient's name field 300 displayed in FIG. 7, MM 251 automatically checks the fields 304 of sub-entries 301 of the selected entry 300 against the media of the message to determine if any field 304 indicates that its corresponding address in field 303 handles (i.e., is capable of receiving) all media of the message, at step 420. If so—for example, if the message is a multi-media message and the desired message recipient 105 is a subscriber of MMMS 101, or if the message is a text-only, a voice-only, or a fax-only message—MM 251 retrieves the telephone number or other address from field 303 of the first-encountered such sub-entry 301 and uses it to address the entire message, at step 422. Addressing the entire message is the equivalent of, and is encompassed by references herein to, separately addressing each component of the message with the same address.

If there is no telephone number for the desired message recipient that is capable of handling all media of the message, as determined at step 420, MM 251 searches through sub-entries 301 of the selected entry 300 to find a telephone number for each medium of the message, at step 424. If MM 251 does not find a telephone number for each medium, as determined at step 426, it notifies the message sender and prompts the message sender for instructions on what to do, at step 428, illustratively by displaying a message on the display of PC 150. Upon receiving the user's instructions, MM 251 checks whether the message sender elected to abort sending the message to the recipient that was selected at step 408, at step 430. If the sender elects to abort, MM 251 merely proceeds to step 436 to determine what the sender wants to do next. If the sender elects to proceed with sending the message to the selected recipient, as determined at step 430, or if a telephone number was found for each message medium, as determined at step 426, MM 251 individually addresses each message component for whose medium a telephone number was found to that corresponding telephone number, at step 432. This results in at least some of the different message components being addressed to different telephone numbers. Those message components for which no telephone numbers were found remain unaddressed, and hence will not be sent to the intended recipient.

After addressing the message or message components, at step 422 or 432, MM 251 shows the message as having been addressed to the selected recipient, at step 434, by displaying the recipient's name, and optionally also the addresses to which the message components are being sent, in the message creation and transmission window (see FIG. 6). MM 251 then awaits input from the message sender. If the message sender chooses to address the message to a different or to an additional recipient, as determined at step 436, MM 251 returns to step 408. If the message sender chooses to exit the personal phonebook, as determined at step 436, MM 251 returns to the message creation and transmission window of FIG. 6, at step 438. MM 251 awaits the message sender's instructions, and responds to them conventionally, at steps 442 et seq. Specifically, when the message sender elects to send the message to its selected recipient or recipients, as determined at step 440, MM 251 sends the entire message and its components' destination telephone numbers to MMMS 101, at step 444. MM 251 then continues to function conventionally, at step 446. MMMS 101 effects delivery of the message components to their respective destination telephone numbers, in a conventional manner.

Figure 5:
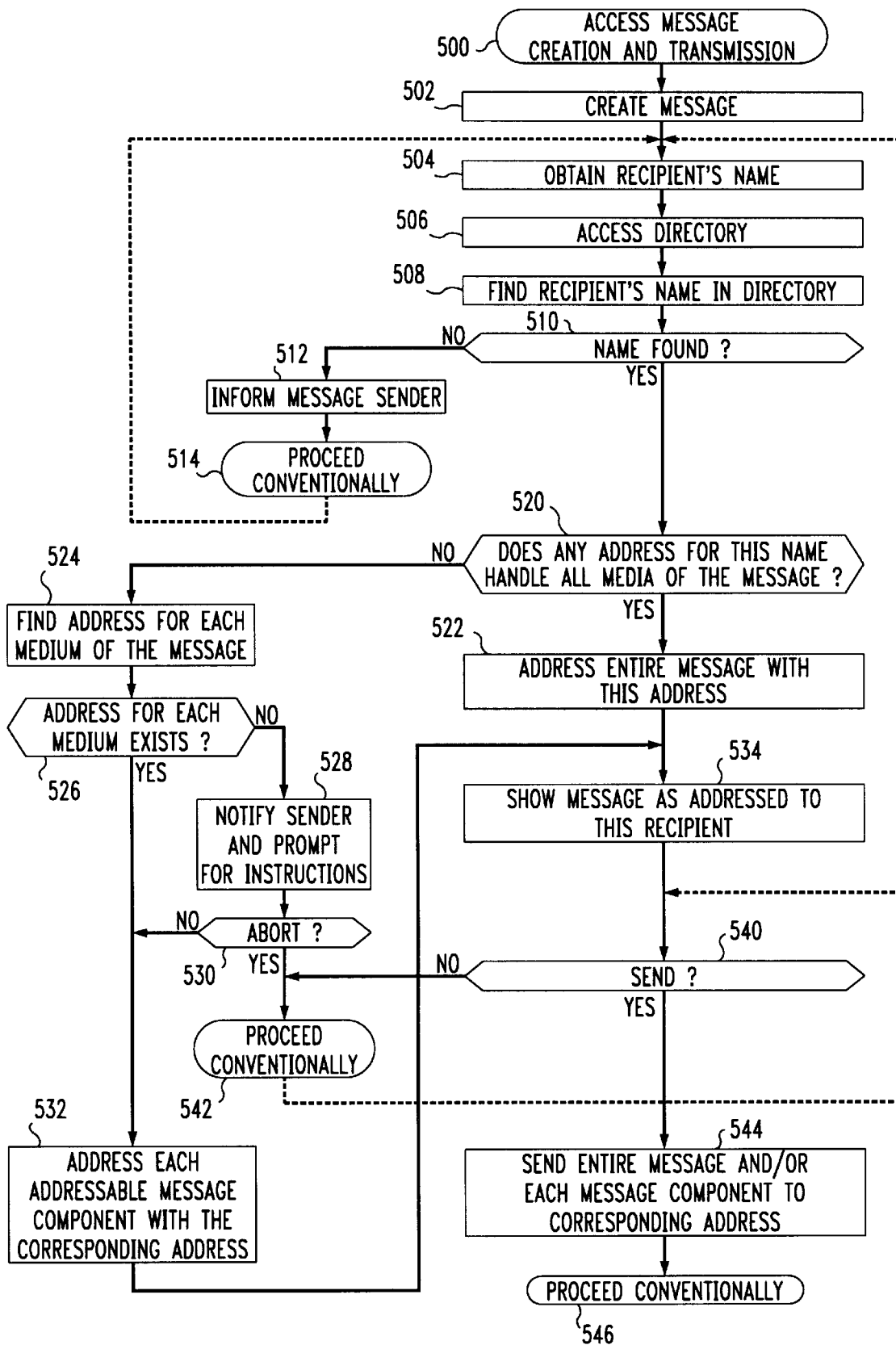
FIG. 5 is a flow diagram of operations of the message manager of the personal computer of FIG. 2 that implement a second illustrative embodiment of the invention.

To create and send a message in the illustrative example of FIG. 5, the message sender invokes MM 251 on PC 150 and accesses the message creation and transmission window thereof, at step 500, and creates the message, at step 502, in the same manner as was described for steps 400 and 402 of FIG. 4. But to address the message to a desired recipient, the message sender merely types in the desired recipient's name in the message creation and transmission window of FIG. 6. MM 251 thus obtains the desired recipient's name, at step 504, and in response, MM 251 accesses the personal phonebook (directory 250), at step 506, to find the name's corresponding entry 300, at step 508. If the name does not appear in directory 250, as determined at step 510, MM 251 informs the message sender thereof, at step 512, and then responds to the sender's further instructions in a conventional manner, at step 514. For example, the message sender may give MM 251 another recipient's name, in which case MM 251 returns to step 504. If MM 251 finds an entry 300 for the obtained name in directory 250, as determined at step 510, it proceeds to address the message or message components in the manner described for steps 420–434 of FIG. 4, at steps 520–534, respectively. MM 251 responds to the message sender's further instructions in the conventional manner, at step 542. The further instructions may include returning to step 504 to select another recipient for the message. When the message sender elects to send the message to its selected recipient or recipients, as determined at step 540, MM 251 sends the entire message and its components' destination telephone numbers to MMMS 101, at step 544. MM 251 then continues to function conventionally, at step 546. MMMS 101 effects delivery of the message components to their respective destination telephone numbers in the conventional manner.

Of course, various changes and modifications to the illustrative embodiments described above will be apparent to those skilled in the art. For example, the message media can include additional media, such as video. Or, the invention—including the directory—may be implemented in a server that is accessed by a terminal device such as the telephone. Also, the addresses may be selected before the creation of the message, whereupon the address is then selected based upon the type of message that has been created. Furthermore, the user interface need not be a text interface, but may be a Touch Tone or a Voice interface. Such changes and modifications can be made without departing from the spirit and the scope of the invention and without diminishing its attendant advantages. It is therefore intended that such changes and modifications be covered by the following claims.

The invention claimed is:

1. A messaging, apparatus comprising:
  a memory for storing a directory of a plurality of addresses each associated with both a message recipient and an indication of media that the message recipient receives at the address, at least some of the addresses being associated with both a same said message recipient and different said media;
  means cooperative with the memory means and responsive to receipt, from a sender of a multimedia message comprising a plurality of components each expressed in a different one of a plurality of media, of an identification of an intended recipient of the message, for automatically searching the directory to find one address at which the intended message recipient receives all media in which the components of the message are expressed, and responsive to a failure to find the one address in the directory, for automatically searching the directory, for each said component of the message, to find an address at which the intended message recipient receives the medium in which the component is expressed;
  means cooperative with the finding means and responsive to the finding means finding the one address in the directory, for automatically addressing the components with the one address, and responsive to the finding means finding a corresponding said address for each said component of the message, for automatically addressing each said component of the message with corresponding said found address, prior to sending of the message from the message sender to the intended recipient; and
  means cooperative with the addressing means, for sending each said addressed component of the message from the message sender to the address with which the component is addressed.

2. The messaging apparatus of claim 1 further comprising means for generating the message; wherein
  the addressing means address each said component of the message prior to sending of the message from the generating means to the intended recipient, and
  the sending means send each said addressed component of the message from the generating means to the address with which the component is addressed.

3. The messaging apparatus of claim 2 wherein:
  the generating means generate the message under control of the message sender.

4. A messaging apparatus comprising:
  a memory for storing a directory of a plurality of addresses each associated with both a message recipient and an indication of media that the message recipient receives at the address, at least some of the addresses being associated with both a same said message recipient and different said media;
  means for generating a multimedia message comprising a plurality of components each expressed in a different one of a plurality of media;
  means cooperative with the memory and responsive to receipt, from a sender of the message, of an identification of an intended recipient of the message, for automatically searching the directory to find one address at which the intended message recipient receives all media in which the components of the message are expressed, and responsive to a failure to find the one address in the directory, for automatically searching the directory, for each said component of the message, to find an address at which the intended message recipient receives the medium in which the component is expressed;
  means cooperative with the finding means and responsive to the finding means finding the one address in the directory, for automatically addressing the components with the one address, and responsive to the finding means finding a corresponding said address for each said component of the message, for automatically addressing each said component of the message with corresponding said found address, prior to sending of the message from the generating means to the intended recipient; and
  means cooperative with the generating means and the addressing means, for sending each said addressed component from the generating means to the address with which the component is addressed.

5. The messaging apparatus of claim 4 wherein:
  the generating means are for generating the message which further comprises at least one component expressed in a medium other than any one of the plurality of different media;
  the finding means are for finding an address in the directory for each component of the message other than said at least one component;
  the addressing means are for addressing each component of the message other than said at least one component; and
  the sending means are for sending each component of the message other than said at least one component;
  whereby only those message components that are expressed in media for which the directory has an associated address of the intended message recipient, are sent to the intended message recipient.

6. The messaging apparatus of claim 4 wherein:

the finding means comprise means for selecting, under control of the message sender, addresses in the directory that are associated with the intended message recipient; and means responsive to the selecting means, for automatically finding, for each said component of the message, the address among the selected addresses in the directory at which the intended message recipient receives the medium in which the component is expressed.

7. The messaging apparatus of claim 4 wherein:

the finding means comprise means responsive to receipt from the message sender of an identifier of the intended message recipient, for using the identification to automatically select from the directory the addresses that are associated with the intended message recipient; and means responsive to the using means, for automatically finding, for each said component of the message, the address among the selected addresses in the directory at which the intended recipient receives the medium in which the component is expressed.

8. The messaging apparatus of claim 7 wherein:

the identifier is a name of the intended message recipient.

9. A message-sender interface to a messaging apparatus having means for generating a multimedia message comprising a plurality of components each expressed in a different one of a plurality of media and means for sending each addressed said component of the message from the generating means to the address with which the component is addressed, the interface comprising:

a memory for storing a directory of a plurality of addresses each associated with both a message recipient and an indication of media that the associated message recipient receives at the address, at least some of the addresses being associated with both a same said recipient and different said media;

first means cooperative with the memory and responsive to receipt, from a sender of a message generated by the generating means, of an identification of an intended recipient of the message, for automatically searching the directory to find one address at which the intended message recipient receives all media in which the components of the message are expressed, and responsive to a failure to find the one address in the directory, for automatically searching the directory, for each said component of the message, to find an address at which the intended message recipient receives the medium in which the component is expressed; and second means cooperative with the finding means and responsive to the finding means finding the one address in the directory, for automatically addressing the components with the one address, and responsive to the finding means finding a corresponding said address for each said component of the message, for automatically addressing each said component of the message with the corresponding said found address, prior to the sending means sending the message from the generating means to claim ended recipient.

10. The message-sender interface of claim 9 comprising:

a computer-usable program storage device having directory means, said first means, and said second means embodied therein, said directory means for implementing said directory and said directory means, said first means, and said second means being computer-readable program code means for causing the computer to perform the functions of the message-sender interface.

11. A message-sender interface to a messaging apparatus having a memory that stores a directory of a plurality of addresses each associated with both a message recipient and an indication of media that the associated message recipient receives at the address, at least some of the addresses being associated with both a same said recipient and different said media, means for generating a multimedia message comprising a plurality of components each expressed in a different one of a plurality of media, and means for sending each addressed said component of the message from the generating means to the address with which the component is addressed, the interface comprising:

first means cooperative with the memory and responsive to receipt, from a sender of a message generated by the generating means, of an identification of an intended recipient of the message, for automatically searching the directory to find one address at which the intended message recipient receives all media in which the components of the message are expressed, and responsive to a failure to find the one address in the directory, for automatically searching the directory, for each said component of the message, to find an address at which the intended message recipient receives the medium in which the component is expressed; and second means cooperative with the finding means and responsive to the finding means the one address in the directory, for automatically addressing the components with the one address, and responsive to the finding means finding a corresponding said address for each said component of the message, for automatically addressing each said component of the message with the corresponding said found address, prior to the sending means sending the message from the generating means to the intended recipient.

12. The message-sender interface of claim 11 comprising:

a computer-usable program storage device having said first means and said second means embodied therein, said first means and said second means being computer-readable program code means for causing the computer to perform the functions of the message-sender interface.

13. The interface of claim 9 for a messaging apparatus whose generating means generate the message with at least one component expressed in a medium other than any one of the plurality of different media, wherein:

the first means are for finding an address in the directory for each component of the message other than said at least one component;

the second means are for addressing each component of the message other than said at least one component; and the sending means send each component of the message other than said at least one component;

whereby only those message components that are expressed in media for which the directory has an associated address of the intended message recipient, are sent to the intended message recipient.

14. The interface of claim 11 for a messaging apparatus whose generating means generate the message with at least one component expressed in a medium other than any one of the plurality of different media, wherein:

the first means are for finding an address in the directory for each component of the message other than said at least one component;

the second means are for addressing each component of the message other than said at least one component; and the sending means send each component of the message other than said at least one component;

whereby only those message components that are expressed in media for which the directory has an associated address of the intended message recipient, are sent to the intended message recipient.

15. The messaging apparatus of claim 1 wherein:

the received message further comprises at least one component expressed in a medium other than any one of the plurality of different media;

the finding means are for finding an address in the directory for each component of the message other than said at least one component;

the addressing means are for addressing each component of the message other than said at least one component; and the sending means are for sending each component of the message other than said at least one component;

whereby only those message components that are expressed in media for which the directory has an associated address of the intended message recipient, are sent to the intended message recipient.

* * * * *